United States Patent
Eckardt et al.

(10) Patent No.: US 6,468,464 B1
(45) Date of Patent: Oct. 22, 2002

(54) METHOD AND APPARATUS FOR INJECTION MOLDING PARTS

(75) Inventors: Helmut Eckardt, Meinerzhagen; Jurgen Ehritt, Hilchenbach; Karl-Heinz Hill, Ludenscheid, all of (DE)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/491,009

(22) Filed: Jan. 25, 2000

(30) Foreign Application Priority Data

Jan. 26, 1999 (DE) ......................... 199 02 990

(51) Int. Cl.[7] .................. B29C 45/00; B29C 45/48; B29C 45/63
(52) U.S. Cl. .................. 264/328.18; 264/328.19; 425/203; 425/204; 425/557; 425/559
(58) Field of Search ............... 264/328.18, 328.19; 425/203, 204, 557, 559, 561

(56) References Cited

U.S. PATENT DOCUMENTS 3,746,489 A * 7/1973 Rizzi et al. ............... 425/205
5,925,295 A * 7/1999 Nakamura et al. .......... 264/40.1

FOREIGN PATENT DOCUMENTS

| DE | 2419961 A1 * | 11/1975 |
| DE | 74 14 436 U1 | 7/1977 |
| DE | 42 36 662 A1 | 5/1993 |
| DE | 297 16 742 U1 | 1/1998 |
| DE | 196 53 099 A1 | 6/1998 |
| DE | 197 15 229 A1 | 10/1998 |
| EP | 0 672 512 A2 | 9/1995 |
| GB | 996102 | 6/1965 |
| JP | 02-178012 A | 7/1990 |

* cited by examiner

Primary Examiner—Leo B. Tentoni
(74) Attorney, Agent, or Firm—Hamilton, Brook, Smith & Reynolds, P.C.

(57) ABSTRACT

The invention relates to a method and an apparatus for injection molding parts, which comprises a mixture of at least one plastic material and at least one additive in the form of fibrous or powdered fillers or reinforcement materials. The method comprises the following steps: a) plasticizing a mixture of the plastic material with the fillers or reinforcement materials, in a reciprocating screw plasticizing and injection unit, by rotating a plasticizing and injection screw, which is disposed in a preplasticizing cylinder so that it can move rotationally and axially; b) expelling the plasticized mixture of plastic material and filler or reinforcement material by the axial movement of the plasticizing and injection screw, from the reciprocating screw plasticizing and injection unit, into a mixing element; c) homogenizing the mixture of plastic material and filler or reinforcement materials in the mixing element, by a mixer, which is disposed movably in the mixing element and which is driven by a mechanical drive; and d) expelling the homogenized mixture of plastic material and filler or reinforcement materials from the mixing element into an injection molding tool. The combination of a reciprocating screw unit and a "dynamic mixer" achieves a gentle processing especially of long-fiber additives.

28 Claims, 7 Drawing Sheets

METHOD AND APPARATUS FOR INJECTION MOLDING PARTS

BACKGROUND OF THE INVENTION

In processing filled or reinforced plastics or plastics mixtures, problems frequently arise in connection with mixing the individual components of the mixture that will be injection molded. Particularly in the case of long-fiber reinforcement materials (e.g., glass fibers, carbon fibers, natural fibers such as wood), it is not only necessary to treat the material gently so as to damage the fibers as little as possible, but also to distribute the material as uniformly as possible. Problems arise especially when fillers such as e.g., talc, chalk, mineral fillers, or glass fibers are to be admixed to a basic plastic mass, and the mixture is to be homogenized.

Mixing chambers are indeed known, e.g., from the DE 74 14 436 U1. Multi-component plastics, especially polyurethane, are processed thereby conducting the individual components of the mixture to a mixing chamber. The individual components are transported to the mixing chamber through feedlines. At the same time, an agitator, situated in the mixing chamber, is started. The mixed plastic thus also begins to exit from the outlet opening of the mixing chamber into the mold cavity.

SUMMARY OF THE INVENTION

Initial problems arise when the plastic base material of the mixture is to be processed in a classical injection molding machine, which generally is equipped with a reciprocating screw plasticizing and injection unit. Difficulties that arise because the discontinuous plasticizing process acts on the mixing process in the mixing element, which operates best continuously.

The prior art contains hardly any examples of a solution if plastics with fibrous or powdered fillers or reinforcing materials are to be mixed and homogenized.

The only solutions known for this are such where the plasticizing and injection screw effects both the melting and the homogenizing process; the plastic base material as well as the fillers are conducted into the mixing region of the screw. But such solutions do not lead to an especially good result: Melting, metering, uniform mixing, and injecting are component processes which require different process conditions. In such a unit, the process becomes possible only by accepting compromises. Especially with long-fiber additives or fillers, the fibers can be substantially damaged, which impairs the quality of the finished molded part.

Consequently, solutions have also been used, which have tried to meter the fillers into a plastic base mass through specially designed screws. In this connection, double-screw extruders should especially be mentioned, but these require continuous operation, while the injecting process must proceed discontinuously. This disadvantageously entails the necessity of quite complicated coordination, so that the continuously operating double-screw extruder, with a prescribed output, can be matched to the intermittently operating injection molding process.

As a result, the invention is directed to a method and an associated apparatus by means of which it becomes possible to admix arbitrary amounts of additives in the form of fibrous or powdered fillers or reinforcement materials, especially glass fibers, carbon fibers, wood fibers, chalk, mineral fillers, and/or talc to the plastics which have been melted in classical reciprocating screw plasticizing and injection units, and to homogenize the resulting mixture. That is, various components are to be compounded directly in the injection molding machine, and the components are to be mixed with one another. An essential feature here is that the homogeneous mixture is achievable when long-fiber additives are admixed, without any, or only limited, destruction of the fibers.

In general, in accordance with an aspect of the present invention, a process includes the following steps: a) plasticizing a mixture of the plastic material with the fillers or reinforcement materials contained therein, in a reciprocating screw plasticizing and injection unit, by rotating a plasticizing and injection screw, which is disposed in a preplasticizing cylinder so that it can move rotationally and axially; b) expelling the plasticized mixture of plastic material and filler or reinforcement material by the axial movement of the plasticizing and injection screw, from the reciprocating screw plasticizing and injection unit, into a mixing element; c) homogenizing the mixture of plastic material and filler or reinforcement materials in the mixing element, by a mixer, which is disposed movably in the mixing element and which is driven by a mechanical drive; and d) expelling the homogenized mixture of plastic material and filler or reinforcement materials from the mixing element into an injection molding tool.

The basic idea of the invention accordingly is that a known reciprocating screw plasticizing and injection unit is followed by a "dynamic mixer," the purpose of which is to achieve good homogenization in applications where long-fiber additives are to be admixed to a plastic base component. An embodiment of the proposed process combination yields the advantage that, as a result of the follow-on mixer, the admixed fibers are typically never mechanically stressed to the point of being damaged or broken, either in the mixer itself or in the screw unit. The embodiment of the proposed process sequence gently transports long-fiber components which are to be admixed to the plastic, without excessive mechanical stress, and—in the mixer—homogeneously mixes these with the base mass to generate a homogeneous, or substantially homogenous product.

The screw unit here is primarily responsible for plasticizing and admixing the additive substances, while the homogenization itself takes place primarily in the follow-on "dynamic mixer."

According to a first development, in accordance with the invention, it is proposed that the filler or reinforcement materials are conducted to the already at least partially melted plastic material in the preplasticizing cylinder. The fill or reinforcement materials are here added to the preplasticizing cylinder at a point where melted plastic is already present, but where nevertheless the screw channels of the plasticizing and injection screw are still effective.

It is especially advantageous if the above step d) comprises the following component steps: d1) expelling the homogenized mixture of plastic material and filler or reinforcement materials from the mixing element into a melt storage unit; d2) accumulating in the melt storage unit an amount of mixture sufficient to produce a molded part; and d3) expelling the accumulated mixture from the melt storage unit into the injection molding tool.

A mixture of plastic and additive is thus collected in the melt storage unit and is not injected into the mold until sufficient material for a shot is present.

The invention furthermore can specify that the mixture of plastic material and filler or reinforcement material, which has been expelled from the mixing element or from the melt storage unit, has admixed to it another plastic component before being injected into the injection molding tool. This is of special interest if a part is to be injection molded from several plastic components.

It is further advantageous that the mixing element is filled up by at least two parallel reciprocating screw plasticizing and injection units, of which at least one reciprocating screw plasticizing and injection unit processes a mixture of plastic material and filler or reinforcement material.

For good mixing in the "dynamic mixer," it can be specified that the mixer performs a rotational motion at a time-varying rate, according to rotation per minute (rpm) profile that is stored in the control of the injection molding machine. In particular, it can be specified that the mixer does not rotate while the mixture is being plasticized.

The apparatus for injection molding parts which include a mixture of at least one plastic material and at least one additive in the form of fibrous or powdered fillers or reinforcement materials, especially glass fibers, carbon fibers, wood fibers, chalk, mineral fillers, and/or talc, comprises: at least one reciprocating screw plasticizing and injection unit for plasticizing a mixture of plastic material with filler or reinforcement materials contained therein, by means of a plasticizing and injection screw, which is disposed in a preplasticizing cylinder so that it can move rotationally and axially, and an injection molding tool, into which the plasticized mixture of plastic material and filler or reinforcement materials is injected.

The apparatus features a mixing element disposed between the reciprocating screw plasticizing and injection unit and the injection molding tool, the mixing element containing a mixer which is driven by a mechanical drive, to homogenize the mixture of plastic material with the filler or reinforcement materials contained therein.

A development specifies that an infeed device for the additive is present to feed filler or reinforcement materials into the already at least partly melted plastic material, by the infeed device conducting the filler or reinforcement materials into the region of the preplasticizing cylinder.

It is further advantageous to have a melt storage unit disposed between the mixing element and the injection molding tool. The melt storage unit has means for injecting the accumulated plastic material into the injection molding tool.

For processing at least two plastics, it is advantageous that at least one other reciprocating screw plasticizing and injection unit is present to admix another plastic component to the mixture of plastic material and filler or reinforcement materials, before their being injected into the injection molding tool.

Here, it can be advantageous that at least two parallel reciprocating screw plasticizing and injection units are present. (By parallel is meant the function and not the geometric arrangement).

As regards the design of the screw, several arrangements have been recognized as suitable: First, it can be specified that the plasticizing and injection screw is designed as a triple or multi-zone screw. Further, it is appropriate that the plasticizing and injection screw is designed as a screw equipped with a mixing section or a barrier section, or a barrier and mixing section. Finally, it is advantageous that the plasticizing and injection screw is designed as a venting screw.

Plastic mixtures are processed especially appropriately if it is specified that the infeed device is designed as a transport screw or metering device. The ejection section of the infeed device can be disposed in the venting section of the plasticizing and injection screw.

Finally, it can be specified that a check valve, especially a ball check valve, or a seal, especially a cross-pin seal, is disposed between the mixing element and the melt storage unit.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
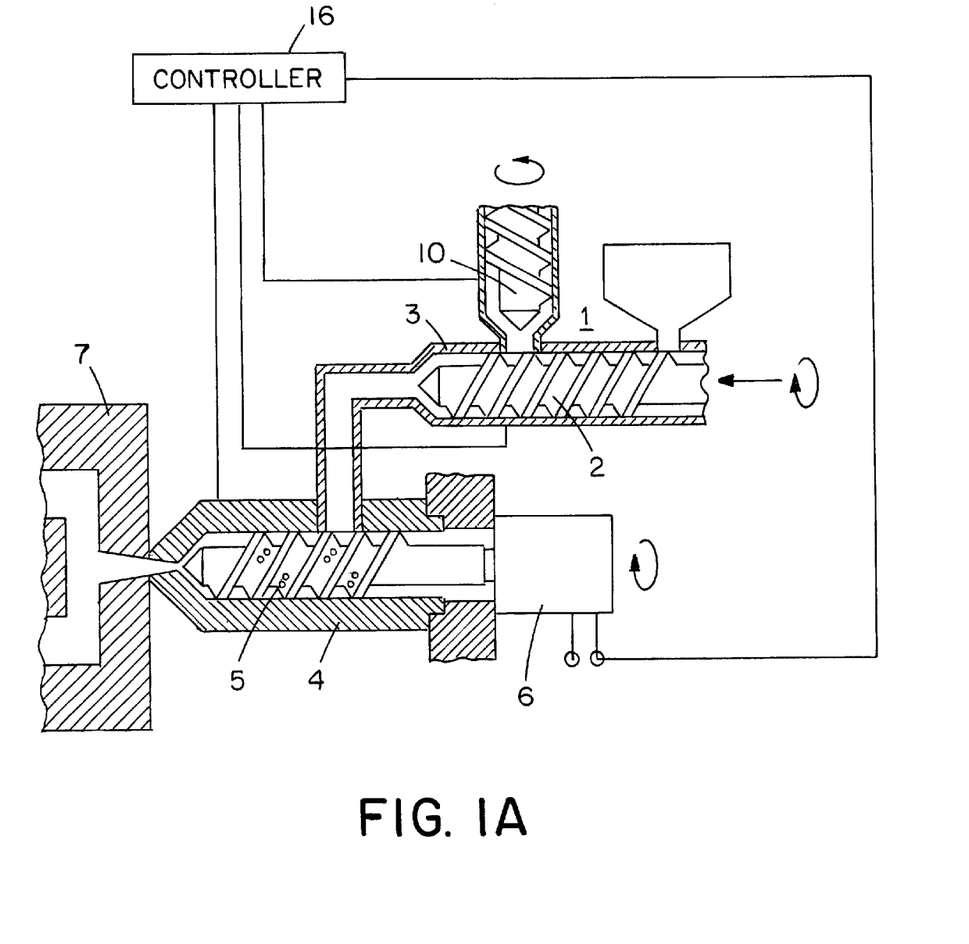
FIG. 1A schematically shows an injection molding apparatus with a reciprocating screw plasticizing and injection unit, and with a follow-on mixing element.

A description of preferred embodiments of the invention follows. FIG. 1A shows an injection molding apparatus, whose essential component is a reciprocating screw plasticizing and injection unit 1. This unit is operated intermittently, i.e., under control of controller 16, after the plastic material has been melted—by the rotational motion of the plasticizing and injection molding screw 2—the plastic material is injected into an injection molding tool 7 through the axial motion of the screw 2. The arrangement here can be such that an additive in the form of a fibrous or powdered filler or reinforcement material (e.g., glass fibers, carbon fibers, wood fibers, chalk, mineral fillers, talc) is added to the plastic granulate, which is conducted to the preplasticizing cylinder 3 in well-known fashion through a fill-in funnel. The additive is then melted at the same time and is kneaded into the plastic.

But the arrangement can also be such—and this is the case shown in FIG. 1A—that the additives are conducted to the already partly melted plastic by means of a feed-in device 10. This infeed advantageously still takes place in the region of the screw channels of the screw 2, so that the additive is already kneaded into the plastic base material by the screw 2.

However, the homogenization achieved in this way is not sufficient for demanding injection molded parts. Consequently, one aspect of the invention specifies that a mixing element 4 should follow the reciprocating screw plasticizing and injection unit 1. In the embodiment, the mixing element 4 has a mixer 5, which is driven by a mechanical drive 6, e.g., a hydro- or servo-motor; the mixer therefore is a "dynamic mixer," since it has active mixing elements.

The reciprocating screw plasticizing and injection unit 1 therefore meters the melt in well-known fashion, in such a manner that the mix 5 is stationary during the metering process. For injection, the plasticized melt is injected into the injection molding tool 7 through the mixing element 4, in which the mixer is now rotating with a desired and prescribed rpm by controller 16.

This yields the advantage that mixing stresses act on the raw material only for a short time, namely the filler time, and the retention time in the mixing element 4 is only very short.

The reciprocating screw used here is preferably designed as a triple- or multi-zone screw, as a vented screw, as a screw equipped with a mixing section, equipped with a barrier, or equipped with both a mixing section and a barrier. The infeed device 10 for the additives can have a transport screw and/or can be equipped with a metering device, so as to achieve precise metering. The venting region of the screw is especially suitable as an outlet for the infeed device.

Figure 1B:
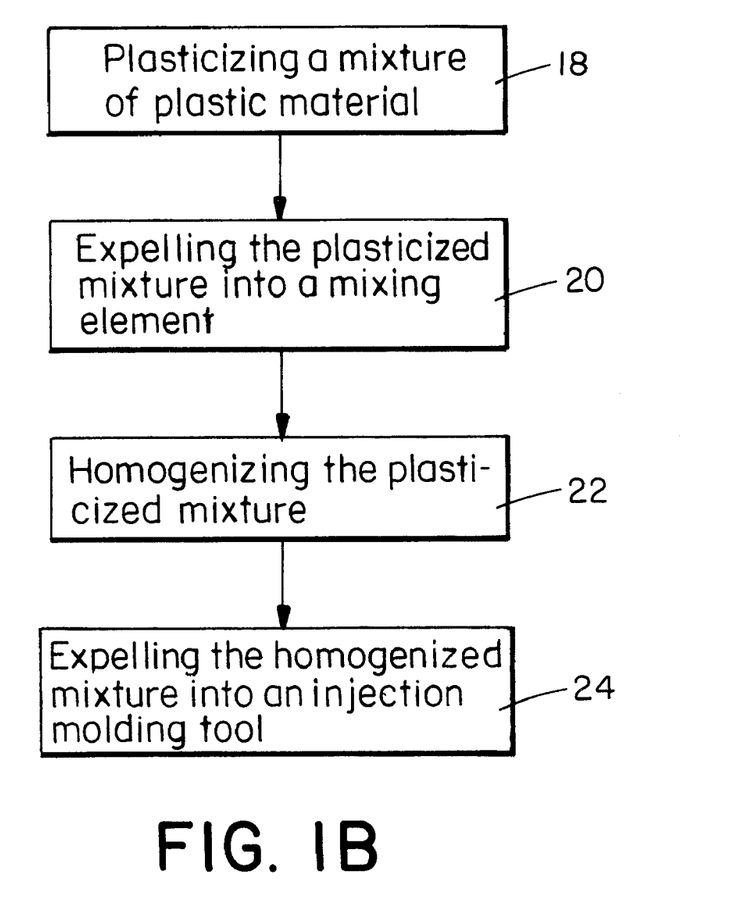
FIG. 1B shows a method for implementing an embodiment of the present invention.

FIG. 1B illustrates a method for implementing an embodiment of the present invention. In step 18, a mixture of the plastic material is plasticized in a reciprocating screw plasticizing and injection unit 1 by rotating a plasticizing and injection screw 2 under control by controller 16. In step 20, the plasticized mixture is expelled by axial movement of the plasticizing and injection screw 2 into a mixing element 4. In step 22, the plasticized mixture is homogenized by a mixer 5 which is disposed movably in the mixing element 4 and which is driven by a mechanical drive 6. The homogenized mixture is expelled, in step 24, into an injection molding tool 7.

Figure 2:
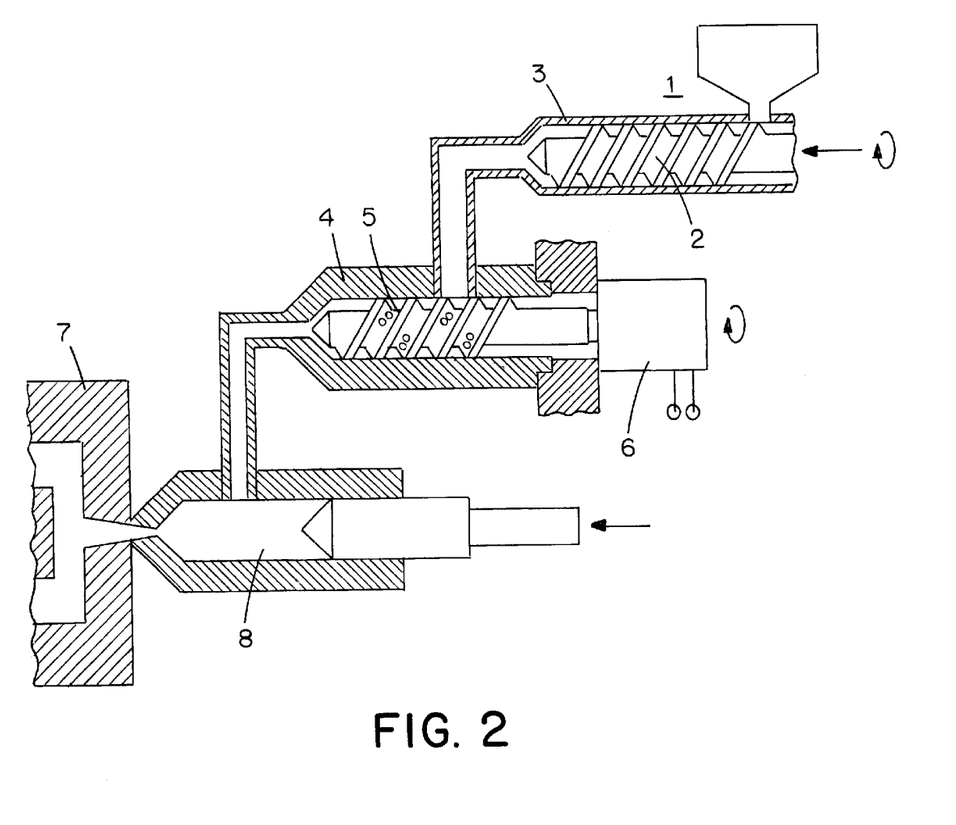
FIG. 2 shows an injection molding unit, which has a melt storage unit, as a supplement to FIG. 1A.

FIG. 2 shows a somewhat different embodiment of the injection molding apparatus. In FIG. 1A, the mixture homogenized by the mixing element 4 was directly injected into the tool 7; however, in FIG. 2 the mixture is first transported from the mixing element 4 to a melt storage unit or to a transfer cylinder 8. The melt is then injected into the tool from the melt storage unit 8.

The reciprocating screw plasticizing and injection unit 1 first meters the desired volume of melt and additives, and injects the mixture, after the mixture has passed the mixing element 4, into the melt storage unit 8, again by a controller. This process occurs outside the actual injection and holding pressure process into the tool. The connection between the mixing element 4 and the melt storage unit 8 preferably has a check valve or seal—not shown—which prevents the mixture from flowing from the storage unit 8 back into the mixing element 4 during the injection process. Embodiments of the check valve or seal can be, e.g., ball check valves or cross-pin seals, i.e., devices which make possible a specified opening and closing of the melt channel. Such designs are especially advantageous when processing plastics reinforced with long fibers.

The advantage of the embodiment shown in FIG. 2 is that the actual filling process can take place separately from the homogenizing process in the mixing element. As a consequence, the injection rate and fill time are matched specifically to the particular molded part, and is independent of the filling process of the melt storage unit 8.

The embodiments according to FIGS. 1A–2 are especially suitable for processing additives with extremely long fibers. It is also possible to combine the fill process with various injection molding processes. The melt thus can be injected directly into the closed tool. Alternatively, the melt can also be injected into the closed or partly closed tool such that, depending on the fill level, the tool is opened again, so as to be closed again in a subsequent stamping process. This achieves a low-pressure distribution of the melt. Furthermore, alternative injection molding sequences are conceivable, in which the tool is first injected by a slot adjusted for an initial volume, and is then closed.

Figure 3A:
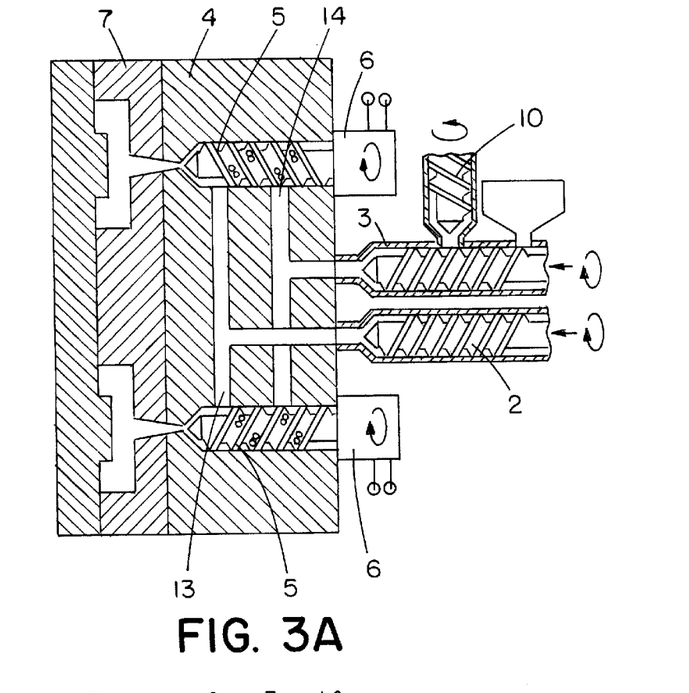
FIGS. 3A and 3B show a design variant, in which the mixing elements are arranged in the tool.
Figure 3B:
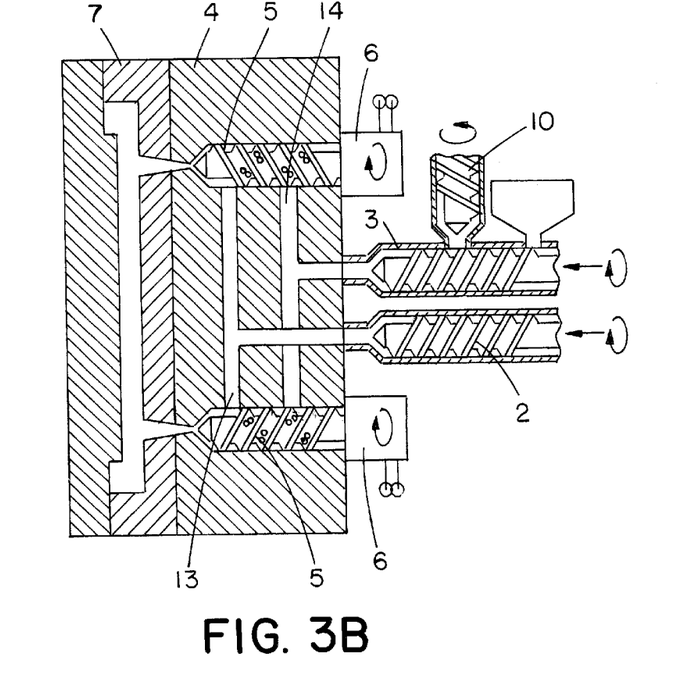

Naturally, variants of the shown embodiments are also conceivable and suitable, such that the mixing element 4 is disposed at several injection points, respectively directly at the injection point or at the tool. This means that, if several injection points are used, e.g., by hot-channel systems, a "dynamic mixer" is disposed at each injection point, is activated during the injection process, and causes intense mixing. FIGS. 3A and 3B show corresponding design variants. The connection ducts 13, 14 are here shown displaced. In the embodiment of FIG. 3A, mixers 5 feed separate mold cavities. In the embodiment of FIG. 3B, mixers feed the same mold cavity at remote sections.

Figure 4:
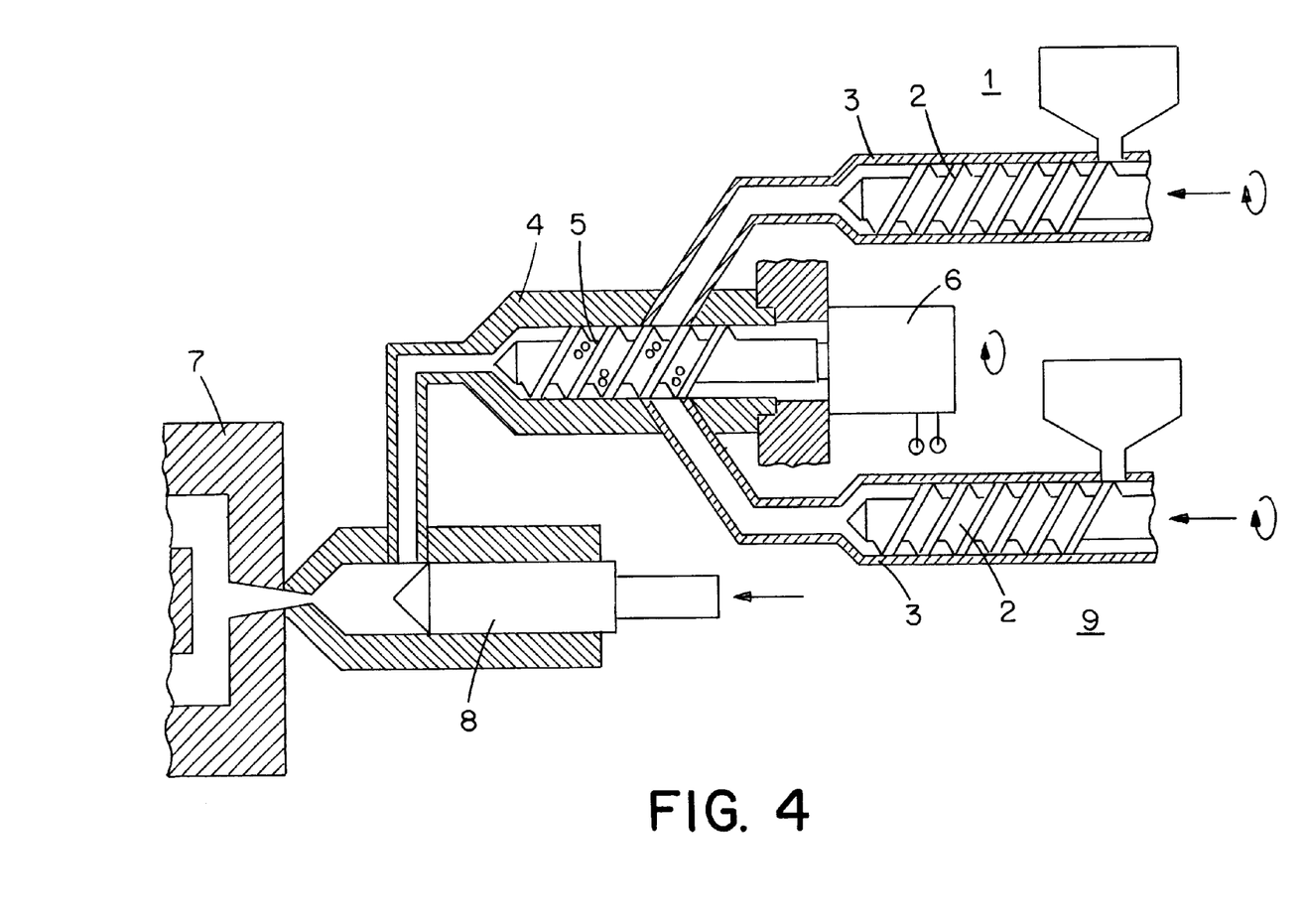
FIG. 4 shows another variant with two reciprocating screw plasticizing and injection units.

FIG. 4 shows another variant of the inventive injection molding apparatus. Here, two plastic components are processed at least one of which has an additive in the form of fibrous or powdered fill or reinforcement materials. The two plastics are processed, i.e., melted, in the respective reciprocating screw plasticizing and injection units 1 and 9. These two injection units transport and meter not only completely different raw materials (plastics) but also a raw material and another material, e.g., a filler. Furthermore, it is possible to arrange more transport and metering units (see FIG. 1A) at one or both preplasticizing cylinders. It is also possible to arrange more than two injection units, which are connected to the follow-on mixing element 4 through a common connection. As can be seen, the version shown here has a follow-on melt storage unit 8, to which the above discussion under FIG. 2 applies analogously.

Since the injection units 1 and 9 are designed as reciprocating screw units, the individual components are first metered independently, at the same or at different times from one another. During the injection process, the individual injection units are driven in such a way that the desired quantity proportion passes through the mixing element 4, where the components, together with fillers or reinforcing materials, are mixed together and the mixture is homogenized. The storage unit 8 is filled with melt by an injection process which lasts only a relatively short time. As described before in connection with FIG. 2, the injection process takes place by means of the melt storage unit 8, which also applies the holding pressure.

An advantage of the design shown in FIG. 4 is that it is especially suitable for compounding purposes. Thus, not only plastics with a different consistency (e.g., polypropylene (PP) and polystyrene (PS), which otherwise cannot be combined with one another) can be mixed together, but it is also possible to add to one or the other plastic one of the additives under discussion here. Since conventional reciprocating screw units 1 and 9 are involved here, discontinuous operation is possible, without negative effects on quality needing to be feared. This apparatus is also especially advantageous for processing long-fiber components in the plastic, since here, too, a gentle treatment of the mixture is assured.

Figure 5:
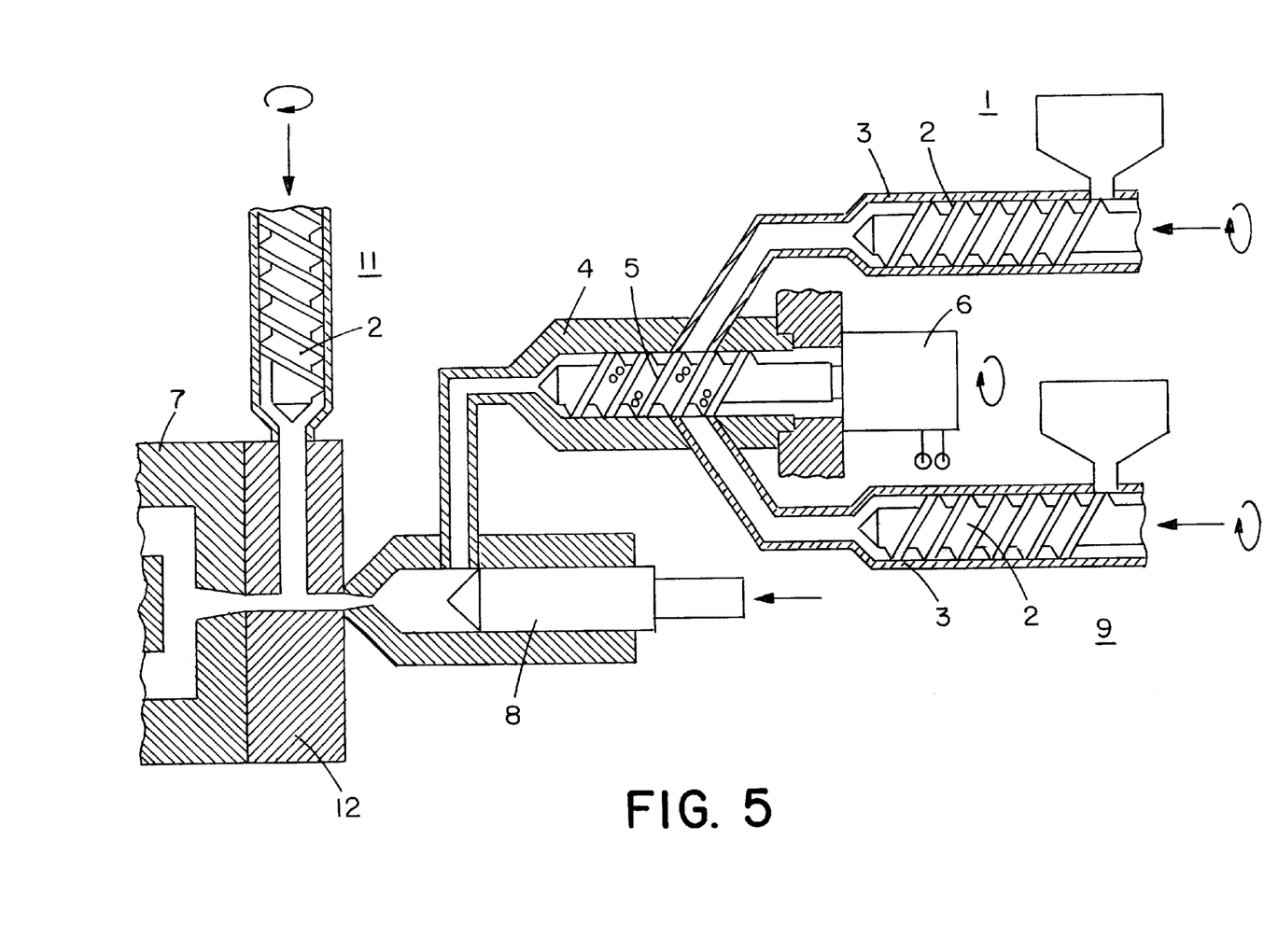
FIG. 5 shows another design with another injection unit.

FIG. 5 shows a combination of the apparatus of FIG. 4 with another injection unit 11, the injection unit here being drawn vertically. The apparatus shown here, and the intermediate plate 12, which is disposed at the tool 7, or also a two-channel nozzle—not shown—which is directly connected to the melt storage unit 8 and the injection unit 11 inject the material to produce triple-layer molded parts, such that the main material is delivered by the injection unit 11 and the core material by the injection units 1 and 9, or vice versa. In this way, molded parts can be produced with especially good properties, having high rigidity and strength, in combination with coordinated surface qualities.

The apparatuses shown in FIGS. 4 and 5 are also especially suited for processing recycling materials, especially also for plastic mixtures with fillers or reinforcement materials.

Figure 6:
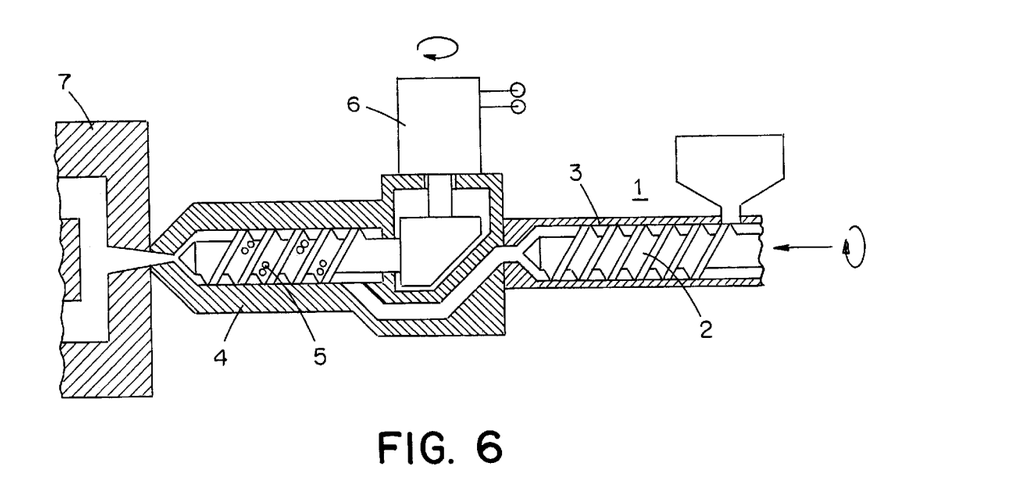
FIG. 6 shows another design variant for the arrangement of plasticizing and injection units and a mixing element.
Figure 7:
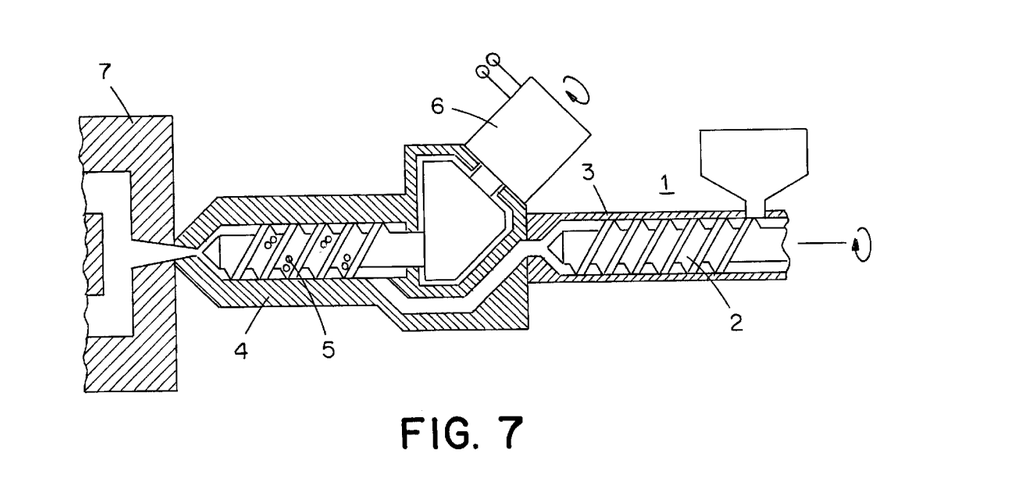
FIG. 7 shows a variant of FIG. 5.

FIGS. 6 and 7 show other design variants for the arrangement of plasticizing and injection units 1, 9 and a mixing element 4. The method of injecting molding parts is the same.

Example 1

Polypropylene with 40% glass fiber material, with glass fiber lengths about 12 mm, was first injected into the tool 7 through the "dynamic mixer" without mixing motion (rotation of the mixer 5). Plate-shaped molded parts were injection molded, which exhibited a quite good distribution of glass fibers, but tended to warp strongly.

Example 2

The same material was then injected into the tool under otherwise identical injection conditions, but now with the mixer 5 rotating. The molded parts exhibit a very uniform surface structure, and the fibers were distributed more uniformly. The more uniform distribution has the consequence that the plates—compared to Example 1—exhibited no warping.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for injection molding parts, comprising the following steps:
   a) plasticizing a mixture of a plastic material and fillers or reinforcement materials in a reciprocating screw plasticizing and injection unit, by rotating a plasticizing and injection screw;
   b) expelling the plasticized mixture of plastic material and filler or reinforcement material by the axial movement of the plasticizing and injection screw, from the reciprocating screw plasticizing and injection unit, into a mixing element;
   c) homogenizing the mixture of plastic material and filler or reinforcement materials in the mixing element, by a mixer, which is disposed movably in the mixing element and which is driven by a mechanical drive; and
   d) expelling the homogenized mixture of plastic material and filler or reinforcement materials from the mixing element into an injection molding tool.

2. The method of claim 1, wherein the fillers include fibrous or powdered fillers.

3. The method of claim 1, wherein the reinforcement materials are selected from the group consisting of glass fibers, carbon fibers, wood fibers, chalk, mineral fillers, and talc.

4. The method of claim 1, wherein the filler or reinforcement materials are conducted to the already at least partially melted plastic material in a preplasticizing cylinder.

5. The method of claim 1, wherein step d) of claim 1 comprises the following component steps:
   d1) expelling the homogenized mixture of plastic material and filler or reinforcement materials from the mixing element into a melt storage unit;
   d2) accumulating in the melt storage unit an amount of mixture sufficient to produce a molded part; and
   d3) expelling the accumulated mixture from the melt storage unit into the injection molding tool.

6. The method of one of the claim 5, wherein the mixture of plastic material and filler or reinforcement material, which has been expelled from the mixing element or from the melt storage unit, has admixed to it another plastic component before being injected into the injection molding tool.

7. The method of claim 1, the mixing element is filled up by at least two parallel reciprocating screw plasticizing and injection units, of which at least one reciprocating screw plasticizing and injection unit processes a mixture of plastic material and filler or reinforcement material.

8. The method of claim 1, wherein the mixer performs a rotational motion at a time-varying rate, according to an rpm profile that is stored in the control of the injection molding machine.

9. The method of claim 8, wherein the mixer does not rotate while the mixture is being plasticized in accordance with step a) of claim 1.

10. The method of claim 1, wherein the plasticizing and injection screw is disposed in a preplasticizing cylinder so that it can move rotationally and axially.

11. An apparatus for injection molding parts, comprising:
   at least one reciprocating screw plasticizing and injection unit for plasticizing a mixture of plastic material and filler or reinforcement materials, by means of a plasticizing and injection screw, the plasticizing and injection unit configured to receive a first source of plastic material to be melted and a second source of filler or reinforcement materials to be partially mixed with at least partially melted plastic material; and
   an injection molding tool, into which the plasticized mixture of plastic material and filler or reinforcement materials is injected;
   wherein a mixing element is disposed between the reciprocating screw plasticizing and injection unit and the injection molding tool, the mixing element comprising a mixer which is driven by a mechanical drive, to homogenize the mixture of plastic material and the filler or reinforcement materials.

12. The apparatus of claim 11, wherein a melt storage unit is disposed between the mixing element and the injection molding tool.

13. The apparatus of claim 12, wherein the melt storage unit has means for injecting the accumulated plastic material into the injection molding tool.

14. The apparatus of claim 11, wherein at least one other reciprocating screw plasticizing and injection unit is present to admix another plastic component to the mixture of plastic material and filler or reinforcement materials, before their being injected into the injection molding tool.

15. The apparatus of claim 11, wherein at least two parallel reciprocating screw plasticizing and injection units are present.

16. The apparatus of claim 11, wherein the plasticizing and injection screw is designed as a triple or multi-zone screw.

17. The apparatus of claim 11, wherein the plasticizing and injection screw is designed as a screw equipped with a mixing section or a barrier section.

18. The apparatus of claim 11, wherein the plasticizing and injection screw is designed as a venting screw.

19. The apparatus of claim 11, wherein the infeed device is designed as a transport screw or metering device.

20. The apparatus of claim 18, wherein an ejection section of the infeed device is disposed in the venting section of the plasticizing and injection screw.

21. The apparatus of claim 12, wherein a check valve, or a seal, is disposed between the mixing element and the melt storage unit.

22. The apparatus of claim 21, wherein the check valve is a ball check valve.

23. The apparatus of claim 21, wherein the seal is a cross-pin seal.

24. The apparatus of claim 11, further comprising a source of fibrous or powdered fillers.

25. The apparatus of claim 11, further comprising a source of glass fibers, carbon fibers, wood fibers, chalk, mineral fillers, or talc.

26. The apparatus of claim 11, wherein the plasticizing and injection screw is disposed in a preplasticizing cylinder so that it can move rotationally and axially.

27. A method for injection molding parts, comprising:

a) plasticizing, in a preplasticizing cylinder, a plastic material to provide at least a partially plasticized material, the plastic being provided to the preplasticizing cylinder by a first source;

b) partially mixing in at least one filler or at least one reinforcement material to the at least partially plasticized material in the preplasticizing cylinder by rotating a plasticizing screw to provide a partially mixed mixture, the at least one filler or the at least one reinforcement material being provided to the preplasticizing cylinder by a second source;

c) expelling the partially mixed mixture into a mixer;

d) substantially mixing the partially mixed mixture to provide a substantially mixed material in the mixer; and e) expelling the substantially mixed material into an injection molding tool.

28. The method of claim 27, wherein in step a), the at least one filler or the at least one reinforcement material is partially mixed with the at least partially plasticized material at a point along the plasticizing screw that does not mechanically stress the at least one filler or the at least one reinforcement material to the point of being damaged or broken.

* * * * *